VOICE OVERRIDE CIRCUIT

Filed Feb. 7, 1967

INVENTOR.
WILLIAM R. HAWKINS
By Flam and Flam
ATTORNEYS.

United States Patent Office 3,518,375
Patented June 30, 1970

3,518,375
VOICE OVERRIDE CIRCUIT

William R. Hawkins, Van Nuys, Calif., assignor to Newcomb Electronics Corp., Sylmar, Calif., a corporation of California Filed Feb. 7, 1967, Ser. No. 614,491
Int. Cl. H04m 9/10
U.S. Cl. 179—1 14 Claims

ABSTRACT OF THE DISCLOSURE

The main signal normally progresses through amplifiers A1, A2 to a speaker S. However, the main signal is attenuated by the action of a transistor T1 when a microphone M is operated. A resistor R0 and transistor T1 form a circuit dividing the main signal. When transistor T1 is in its high impedance state, the mid-terminal Q of the divider transmits to amplifier A1 substantially the full signal strength. A signal derived from the microphone causes a condenser C1 rapidly to charge and transistor T1 to conduct. The terminal Q now scales off only a small portion of the main signal, which is thus attenuated. When the microphone signal reduces below a preset level, the charge on condenser C1 leaks off through resistor R1, and the transistor T1 ultimately shuts off so that normal operation resumes.

BRIEF SUMMARY OF INVENTION

This invention relates to an audio system in which a voice signal from a microphone automatically suppresses the normal music signal which resumes after the voice signal terminates. The primary object of this invention is to provide a simple system of this character incorporating controls necessary for effective operation, namely, a sensitivity control to adjust for background noise, a control to determine the degree of reduction of the music signal, and a time delay control to determine how quickly the music signal is restored. A system of this character may be used effectively by dance instructors and square dance callers, etc.

This invention possesses many other advantages, and has other objects which may be made more clearly apparent from a consideration of several embodiments of the invention. For this purpose, there are shown a few forms in the drawings accompanying and forming a part of the present specification. These forms will now be described in detail, illustrating the general principles of the invention; but it is to be understood that this detailed description is not to be taken in a limiting sense, since the scope of this invention is best defined by the appended claims.

DETAILED DESCRIPTION

Figure 1:
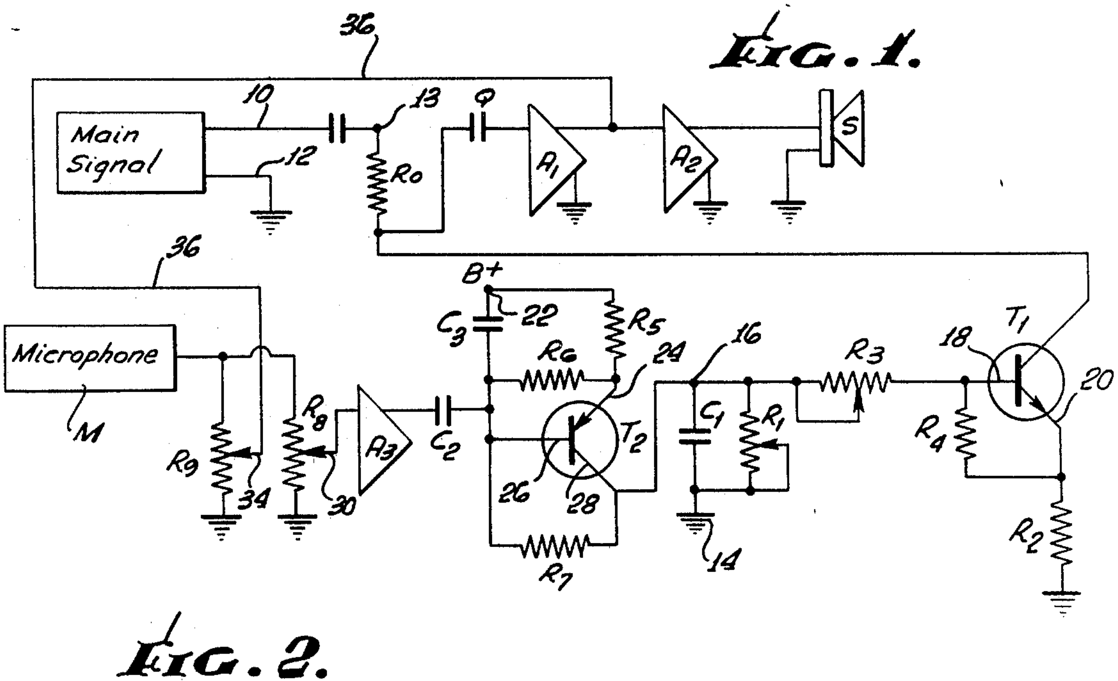
FIG. 1 is a schematic wiring diagram of a system incorporating the present invention.

The system shown in FIG. 1 incorporates a suitable music signal source, such as a phonograph, tape recorder or the like. Output leads 10 and 12 normally apply the music signal to amplifier stages A1 and A2 to a speaker system S. The music signal, however, is first applied across a divider circuit that comprises a resistor R0, the collector and emitter of a transistor T1, and an emitter load resistor R2. When the transistor T1 is nonconductive, its impedance is very high compared to resistor R0. The intermediate terminal Q of the divider circuit connects with the amplifier stage A1. Thus when the transistor is off, substantially the full signal strength is applied to the amplifier stages.

However, when the transistor T1 is made conductive, the main signal is attenuated by the action of the voltage divider and the music is reduced by an amount dependent upon the relative values of R0 and R2 and the extent that transistor T1 may be made conductive. The transistor T1 is made conductive upon the existence of a sufficient signal from a microphone M. The microphone may be a wireless or other type.

When a microphone signal appears, a quick charging circuit is effective for the condenser C1. The condenser charge leaks off through a paralleling variable resistor R1. However, this resistor has a sufficiently high ohmic value so as not to affect the quick charging circuit.

One plate or terminal of the condenser is connected to a common ground terminal 14 and the other plate or terminal 16 is connected via a variable resistor R3 to the base 18 of the transistor T1. A resistor R4 parallels the emitter 20 and base 18 of the transistor T1. The base 18 assumes a potential corresponding to a fraction of the voltage of the condenser C1, the fraction being determined by a divider circuit comprising the resistors R3, R4 and R2 in series and together paralleling the condenser C1.

When the potential of the base 18 is above a certain characteristic value of about one-half a volt, the transistor T1 acts substantially as a closed switch. When the condenser charge leaks off through the shunt resistor R1, the bias potential at the base 18 diminishes. When it reaches a value of less than about a half a volt, the transistor impedance rises steeply and normal operation resumes.

In order quickly to charge the condenser C1, a control transistor T2 is provided. This transistor T2 has an emitter 24 connected through a resistor R5 to a B+ source terminal 22. Resistors R6 and R7 form a voltage divider network to determine the normal potential of the base 26 of the transistor T2. Normally the transistor T2 operates as an open switch. When the transistor is made conductive, current may flow from the source terminal B+ through resistor R5, emitter 24 and collector 28 of the transistor T2 to the condenser C1.

In order to trigger the transistor T2, a signal is derived from the microphone M. The microphone signal is applied across a potentiometer resistor R8. A slider 30 applies a selected fraction of the signal to a high gain amplifier A3. A condenser C2 couples the output of the amplifier A3 to the base 26. Upon the existence of a signal of certain magnitude, the transistor T2 is switched to its conductive phase during alternate half cycles of the signal, and charging current is quickly applied to the condenser C1 as previously described. The condenser C1 remains at full charge while the microphone signal continues. When the signal to the base 26 no longer exists, the charge on the condenser C1 leaks off through the resistor R1. Adjustment of the resistor R1 determines the time lag before cutoff of the transistor T1 and thus the time lag before the music signal is restored to full strength. Preferably the resistor R1 has a minimum ohmic value.

Adjustment of the value of the resistor R3 determines the extent that the transistor T1 is made conductive, and the degree of attenuation of the music signal is thus selected. Preferably the resistor R3 has a minimum setting.

The setting of the slider of the potentiometer resistor R8 compensates for background noises and determines sensitivity.

A potentiometer resistor R9 provides a normal gain control for the microphone signal. Its slider 34 connects via a lead 36 to an appropriate place in the main channel for amplification and application of the speaker system S with isolation from the attenuating divider circuit. The main channel includes a conventional volume control (not shown).

The series condenser C2 is scaled so as to reduce the low frequency response of the transistor T2. A parallel condenser C3 reduces the high frequency response of the transistor T2. Accordingly, only signals in the normal voice range are effective to operate the transistor T2. Noises such as occasioned by moving microphone cords will therefore be isolated.

Figure 2:
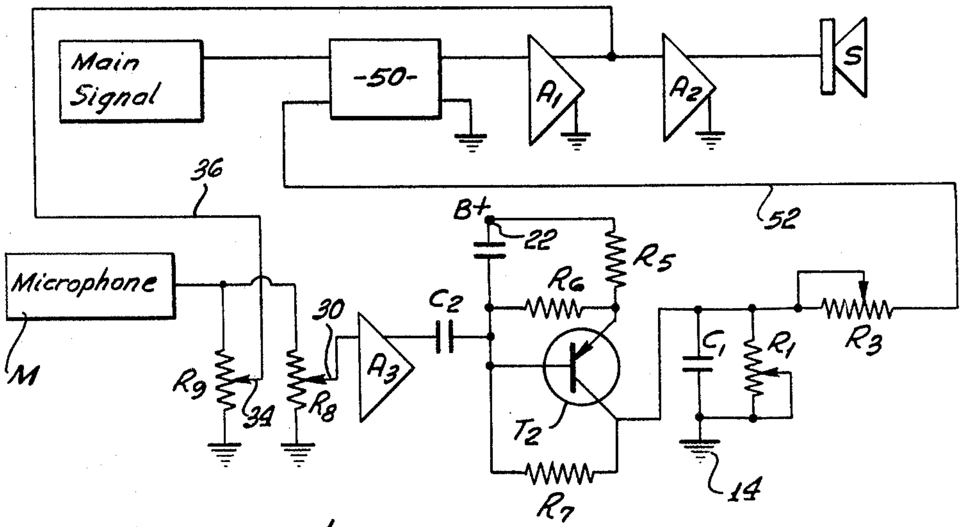
FIG. 2 is a schematic wiring diagram showing a modified system.

In the form illustrated in FIG. 2, the divider circuit for attenuating the main signal is formed in a different manner by interchanging the position of the control element and the fixed resistor. The attenuation network 50 is diagrammatically illustrated in FIG. 2. A lead 52 from the resistor R3 serves to control the network 50. As described in connection with FIG. 1, the voltage of the lead 52 rises upon the existence of a microphone signal and by virtue of the action of the amplifier A3, transistor T2 and condenser C1. When the microphone signal subsides, voltage drops to ground potential by virtue of the discharge circuit provided by resistor R1.

Figure 3:
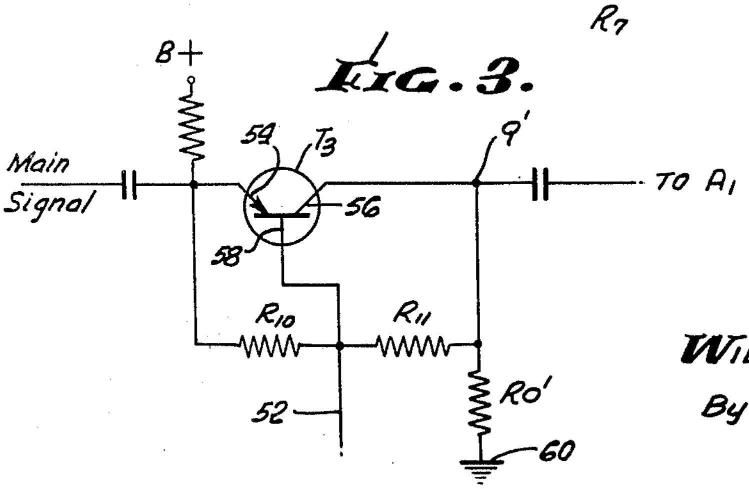
FIG. 3 illustrates a typical circuit for use in FIG. 2.

FIG. 3 shows a typical attenuation circuit for use in FIG. 2. The operative element is a transistor T3 having an emitter 54 and a collector 56 serially inserted between the main signal and the amplifier stage A1. A base 58 is normally biased by resistors R10 and R11 so that the transistor T3 is normally saturated to offer minimal serial impedance to the signal.

The transistor T3 forms with the resistor R0′ a divider network. In this instance, however, the resistor R0′ is adjacent the ground terminal 60, and the transistor T3 is normally on or saturated. Accordingly, the intermediate terminal Q′ of this divider network tarnsmits substantially the full signal strength to the amplifier stage A1. However, when the transistor T3 is made less conductive, the signal strength is scaled down. This occurs when the base voltage rises as the voltage at lead 52 increases corresponding to the existence of the microphone signal. For this purpose, the lead 52 connects to the transistor base 58. Thus upon existence of the microphone signal, the transistor T3 quickly cuts off or assumes a decreased conductivity state, all as determined by resistor R3. When the microphone signal subsides, the base voltage is lowered at a rate determined by resistor R1 and the main signal is restored.

Except as described, the operation of the form of FIGS. 2 and 3 is identical to that described in connection with FIG. 1.

The attenuating network 50 may include a series of transistors rather than a single transistor, or it may include one or more field effect transistors.

I claim:

1. In an audio system: an audio channel having one or more stages of amplification and a speaker; monostabel attenuator means for said audio channel having an output connected to said audio channel and having an input; means applying a normal audio signal to said input; said attenuator means including a controllable impedance element adjustable from a low impedance state to a high impedance state; the signal level applied to said audio channel changing from a relatively high level to a relatively low level upon a change from the monostable state of said controllable impedance element; a microphone; means deriving a control signal from said microphone as well as a voice signal; means for changing said controllable impedance element from its monostable state as a function of the level of said control signal; and means for applying the voice signal to said audio channel independently of said attenuation means.

2. The audio system as set forth in claim 1 together with selectively operable means for changing the functional relationship between said controllable impedance element and the level of said control signal to compensate for background noises.

3. The audio system as set forth in claim 1 together with filter means operable independently of said voice signal deriving means for limiting the frequency characteristics of said control signal to a band within the normal voice range to prevent spurious operation of said controllable impedance element.

4. The audio system as set forth in claim 1 together with time delay means for altering the functional relationship between said controllable impedance element and the level of said control signal to maintain said controllable impedance element in a state corresponding to attenuation of the normal audio signal to compensate for normal pauses in the control signal.

5. The audio system as set forth in claim 4 together with selectively operable means for changing the functional relationship between said controllable impedance element and the level of said control signal to control the degree of attenuation of said normal signal.

6. The combination as set forth in claim 1 in which said attenuator means includes a voltage divider having a fixed impedance element and a transistor serially connected thereto to comprise said controllable impedance element.

7. In an audio system: an audio channel having one or more stages of amplification and a speaker; an attenuator means for said audio channel and having an output connected to said audio channel and having an input; means applying a normal audio signal to said input; said attenuator means including a controllable impedance element adjustable from a low impedance state to a high impedance state; the signal level applied to said audio channel changing from a relatively high level to a relatively low level upon a change in the state of said controllable impedance element; a microphone; means deriving a control signal from said microphone as well as a voice signal; means for changing the state of said controllable impedance element as a function of the level of said control signal; selectively operable means for changing the functional relationship between said controllable impedance element and the level of said control signal to control the degree of attenuation of said normal signal and to compensate for background noises; filter means for limiting the frequency characteristics of said control signal to a band within the normal voice range to prevent spurious operation of said controllable impedance element; time delay means for altering the functional relationship between said controllable impedance element and the level of said control signal to maintain said controllable impedance element in a state corresponding to attenuation of the normal audio signal to compensate for normal pauses in the control signal; and means coupling said voice signal to said audio channel independently of said attenuator means.

8. In an audio system: an audio channel having one or more stages of amplification and a speaker means; means applying a normal audio signal to said channel; a controllable impedance device having a control input and a load output; circuit means including said load output for changing the level of said audio signal in accordance with the impedance characteristics of said load output; a microphone; means deriving a control signal from said microphone as well as a voice signal; a condenser; a switching circuit for quickly charging said condenser and operable in response to a rise in level of said control signal to change said load output to attenuate said audio signal; circuit means connecting said control input to said condenser; means for slowly discharging said condenser to cause controlled growth of said audio signal; and means coupling said voice signal to said audio channel independently of said controllable impedance device.

9. The combination as set forth in claim 8 in which said means for deriving a control signal from said microphone comprises a potentiometer for controlling the sensitivity of said switching circuit.

10. The combination as set forth in claim 9 in which said means for deriving a voice signal comprises another potentiometer for controlling the level of the voice signal applied to said audio channel.

11. The combination as set forth in claim 8 in which said switching circuit includes a transistor having a load circuit including a resistor paralleling said condenser, said resistor being adjustable and serving as the means for slowly discharging said condenser.

12. The combination as set forth in claim 8 in which said controllable impedance device comprises a transistor having an adjustable bias circuit for controlling the extent of attenuation of said normal audio signal upon charging of said condenser.

13. The combination as set forth in claim 11 in which said controllable impedance device comprises a transistor having an adjustable bias circuit for controlling the extent of attenuation of said normal audio signal upon charging of said condenser.

14. The combination as set forth in claim 9 in which said means for deriving a signal from said microphone comprises a potentiometer for controlling the sensitivity of said switching circuit.

References Cited

UNITED STATES PATENTS

| | | | |
|---|---|---|---|
| 3,136,864 | 6/1964 | Cleary | 179—1 |
| 3,283,074 | 11/1966 | Csicsatka | 179—1 |
| 3,423,531 | 1/1969 | Doddington | 179—1 |

KATHLEEN H. CLAFFY, Primary Examiner

J. S. BLACK, Assistant Examiner